United States Patent
Jeanguillaume

[11] Patent Number: 5,448,073
[45] Date of Patent: Sep. 5, 1995

[54] HIGH SENSITIVITY GAMMA CAMERA SYSTEM

[76] Inventor: Christian R. Jeanguillaume, 40, rue de Boissy, 94370 Sucy-En-Brie, France

[21] Appl. No.: 117,938
[22] PCT Filed: Mar. 5, 1992
[86] PCT No.: PCT/FR92/00201
§ 371 Date: Sep. 8, 1993
§ 102(e) Date: Sep. 8, 1993
[87] PCT Pub. No.: WO92/15896
PCT Pub. Date: Sep. 17, 1992

[30] Foreign Application Priority Data
Mar. 8, 1991 [FR] France .................. 91 02861

[51] Int. Cl.⁶ ............................................. G01T 1/166
[52] U.S. Cl. ............................. 250/363.02; 250/363.1
[58] Field of Search .............. 250/363.02, 363.10; 378/149

[56] References Cited
U.S. PATENT DOCUMENTS
3,011,057 11/1961 Anger ..................... 250/363.10
3,936,646 2/1976 Jonker ....................... 378/149
5,021,667 6/1991 Genna et al. .............. 250/363.10

FOREIGN PATENT DOCUMENTS
90594 10/1983 European Pat. Off.
212416 3/1987 European Pat. Off.
8200897 3/1982 WIPO.

Primary Examiner—Carolyn E. Fields
Attorney, Agent, or Firm—Bacon & Thomas

[57] ABSTRACT

A gamma camera system for which a predetermined resolution is sought includes a collimator having at least one opening in which the largest cross-section adjacent the detector is greater than twice the intrinsic resolution of the detector so that plural beams pass through each opening giving plural points of impact on the detector. The detector is displaced by successive steps, the successive steps being of the order of magnitude of a predetermined image resolution. Information collected by the detector is processed by storing locating information corresponding to the impact points for each position of the opening during displacement, and processing the information to reconstruct the radiation volume density function of radiation emitted by the radiation source.

21 Claims, 9 Drawing Sheets

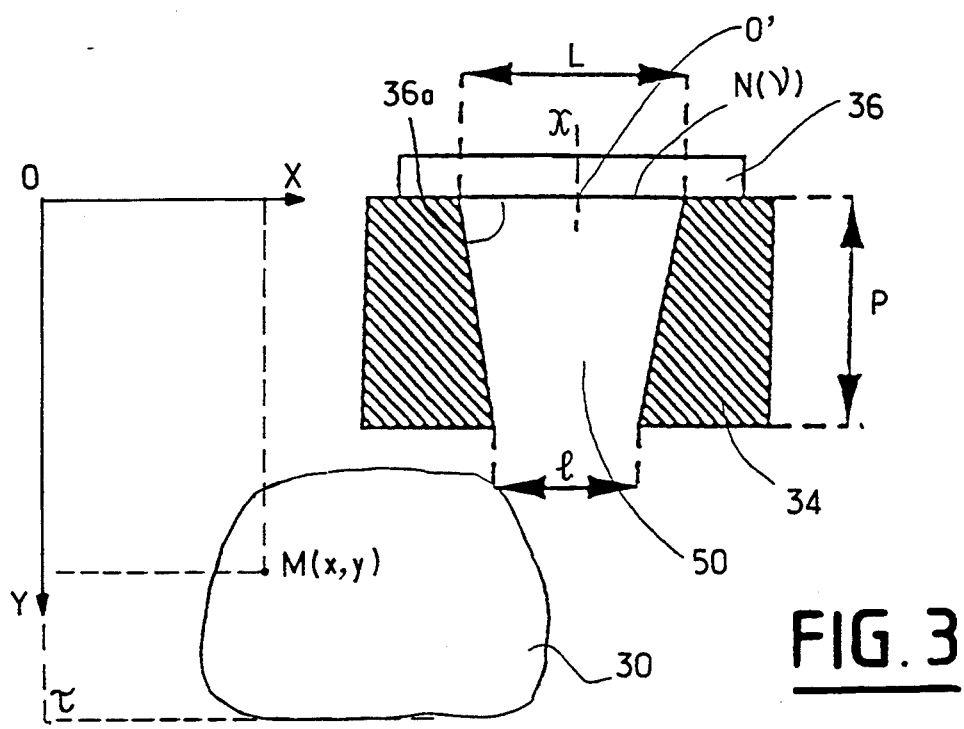
FIG. 3
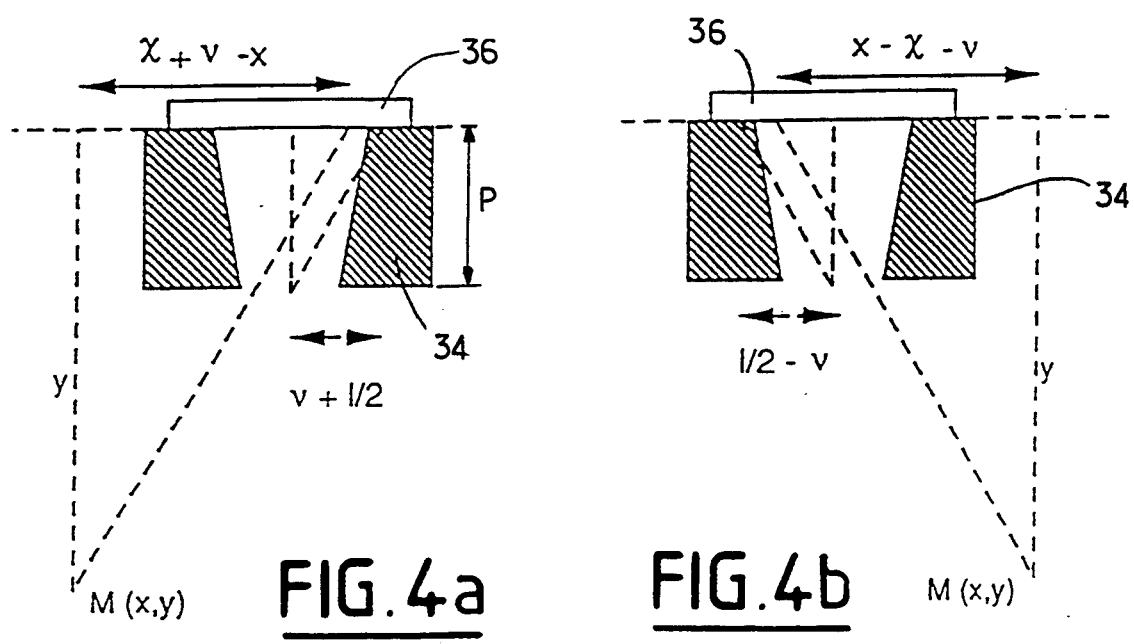
FIG. 4a  FIG. 4b

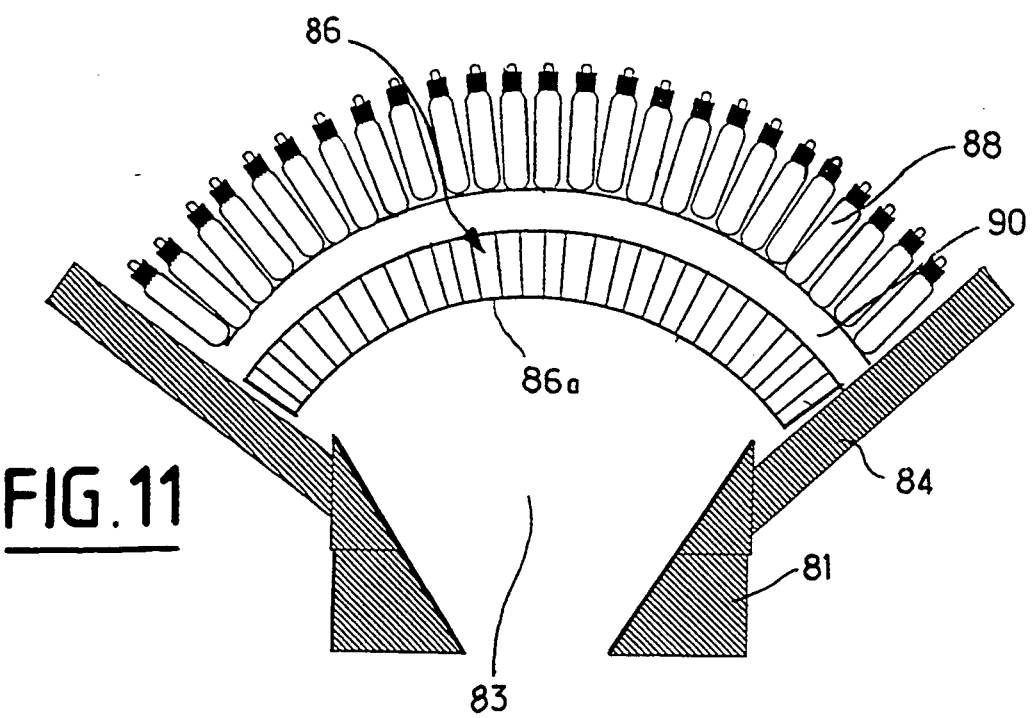
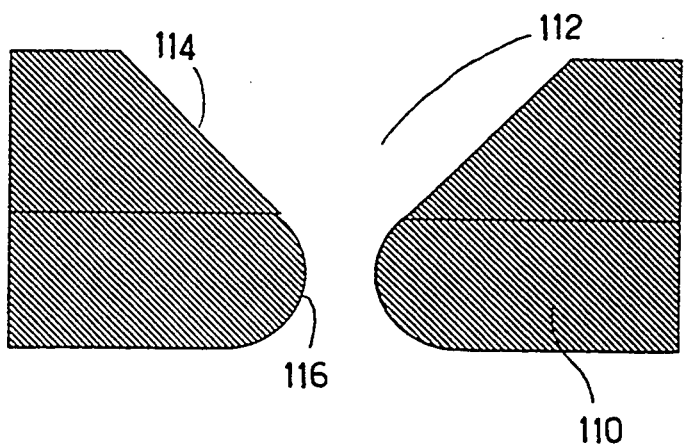
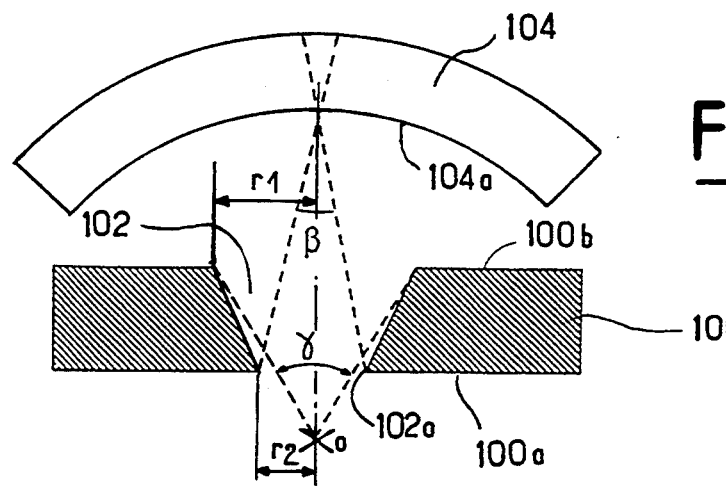

HIGH SENSITIVITY GAMMA CAMERA SYSTEM

BACKGROUND OF THE INVENTION

The subject of the present invention is a high sensitivity gamma camera system.

Medical diagnosis is increasingly calling upon medical imaging techniques and, in particular, nuclear medicine. Despite its mediocre intrinsic image qualities (substantial statistical noise and limited resolution), this nuclear imaging technique is irreplaceable since it affords the practitioner, by way of tracers introduced into the organism to be studied, dynamic information about the physiopathology of the organs and of the functions studied.

Currently, nuclear medicine essentially uses cameras of the Anger type or gamma cameras which make it possible to obtain an image directly under plane projection of the distribution of a radioactive substance, or tracer, emitting gamma radiation. The U.S. Pat. No. 3,011,057 describes the principle of operation of such cameras. Schematically, the apparatus can be divided into two parts: the collimator and the detector. The collimator eliminates most of the gamma rays emitted by the radioactive source to be explored, preserving only those which are parallel to a given direction. To do this, the collimator which consists of a material which absorbs gamma radiation, such as lead, is drilled with a large number of openings of very narrow diameter and whose axes define the direction of projection for the formation of the image. Typically, the collimator has a thickness of the order of 53 mm and includes holes with hexagonal cross section of 1.3 mm semi-width.

The collimator therefore makes it possible to obtain an image projected in the direction defined by the openings of the collimator by transforming the chaotic proliferation of the omnidirectional gamma rays emitted by the various points of the source into a monodirectional latent image.

The detector part of the camera placed behind the collimator is composed essentially of a scintillator for converting the gamma rays into photons and of a system of photodetectors for converting the photons emitted by the scintillator into electrical pulses. Thus, the detector part transforms the latent gamma image into a visible image.

In other words, there is, to a first approximation, a one-to-one relation between a line of points of the gamma-emitting object which lie on a same perpendicular to the plane of the collimator and the point of impact of the photon(s) if it exists, emitted by this line of the observed object, on the photo scintillator.

Although numerous enhancements have been made to the detector part of the Anger camera in order to increase its resolution and lessen these distortions and these field inhomogeneities, the collimator itself has advanced little, remaining in principle a gamma radiation absorbing medium drilled with a multitude of holes as has already been indicated. It is however the collimator which limits the performance of current cameras. Thus, with an intrinsic resolution in respect of the scintillator crystal of the order of 4 mm, the resolution with the collimator is now only 10 mm and the output is lessened by a factor $10^{-4}$. The presence of the type of collimator described above moreover imposes a draconian compromise between the two factors consisting of the resolution and the output of the camera. This setup also entails a substantial degradation in resolution with the distance between the source, that is to say the organ to be observed, and the entrance of the camera.

SUMMARY OF THE INVENTION

In order to remedy these disadvantages, an objective of the present invention is to provide a gamma camera and, in particular, a novel collimator for a gamma camera which makes it possible to increase the sensitivity of the apparatus by a factor which may reach 100.

To achieve this aim, the high sensitivity gamma camera system according to the invention comprises a gamma camera including a collimator, a detector having an intrinsic resolution and placed behind the collimator in order to convert the gamma rays which, having passed through the collimator, impinge on each point of the detector, into electrical signals and in order to give an indication for locating the point of impact of the gamma ray emitted and an assembly for processing the electrical signals in order to formulate an image of the gamma radiation emitter, and means for displacing the said gamma camera by successive steps, and it is characterized in that the collimator comprises at least one opening whose cross section in proximity to the said detector has a dimension greater than the intrinsic resolution of the detector, in that the displacement step of the gamma camera is of the order of magnitude of the resolution sought and in that the processing means comprise means for storing the electrical signals gathered with their locating information for each position of the gamma camera and a processing assembly for processing the information thus stored so as to reconstruct an emitted radiation density function of the form: $\rho(x,y,z)$ for the spatial coordinates x, y and z corresponding to the chosen step.

Preferably, the opening or openings have a cross section having a large dimension at least equal to twice the intrinsic resolution of the detector.

It is thus understood that through the collimator, the scintillator crystal or the detector material will receive for each point of the source emitting gamma radiation not just the radiation emitted in a given direction but all the radiation emitted in a solid angle defined substantially by the position of the source and the aperture of the opening or openings made in the collimator and this for each position of the gamma camera. Thus, the number of photons gathered is much higher than in the case of gamma cameras with parallel collimator.

Furthermore, this technique, through a suitable processing of the various information items received, makes it possible to reconstruct an image in the space of the gamma emission source rather than, as with the prior techniques, a plane image corresponding to a projection of the object forming the source in a given direction defined by the axes of the openings drilled in the collimator.

Other characteristics and advantages of the present invention will emerge more clearly on reading the description which follows of plural embodiments of the invention given by way of non-limiting examples.

BRIEF DESCRIPTION OF THE DRAWINGS

FIG. 3 shows in a simplified way, sectioned through a vertical plane, a simple embodiment of a collimator with a single hole and the mode of labelling used in the present description;

FIGS. 4a and 4b are diagrams showing the parameters taken into account to establish the basic equations of operation of the gamma camera according to the invention;

FIG. 11 is a simplified vertical sectional view of a second embodiment of the gamma camera making it possible to avoid the disadvantages illustrated by FIG. 10;

FIG. 12 is a vertical sectional view of a variant embodiment of the opening made in the collimator;

FIG. 13 is a simplified view of a collimator usable with high energy gamma emitters;

FIG. 18b illustrates a variation of the embodiment shown in FIG. 18a.

Before describing in detail several embodiments of the invention, the basic principle thereof will be set forth below.

DETAILED DESCRIPTION OF THE PREFERRED EMBODIMENTS

In order to improve the performance of gamma cameras, the invention uses the gamma rays emitted within a solid angle of consequent magnitude rather than in a single direction. This effect is obtained by virtue of a collimator composed of at least one cylindrical or conical hole of large dimension, typically greater than 1 cm, sufficient to increase the sensitivity by a factor $10^2$. More generally, the cross section of each hole in proximity to the detector is greater than the intrinsic resolution of the detector, it being possible for this resolution to be of the order of 3 mm. The spatial information degraded by the large dimensions of the opening or openings of the collimator is coded by a displacement of the system consisting of the collimator and the detector with respect to the radioactive source so as to explore the whole surface to be analyzed with a step at least of the same order of magnitude as the resolution sought. Various information items gathered in succession by the scintillator crystal and the photomultipliers are processed in order to reconstruct the image from these data.

The process described briefly above can be approximated to the principle used in transverse axial tomography. In this technique, the spatial depth information is coded by a movement of the detector and reconstructed secondarily by, in particular computer, processing. Very simply, in the technique described above, the movement serves to code the planar information in the plane of the detector and the collimator codes the spatial depth information, that is to say in the direction perpendicular to the plane of the detector. With such a type of data capture, a four-dimensional data set is obtained: two spatial data relating to the position of the detector collimator assembly with respect to the object assumed fixed and two spatial coordinates giving the position of the pixel on the detector having received the photon.

Figure 2A:
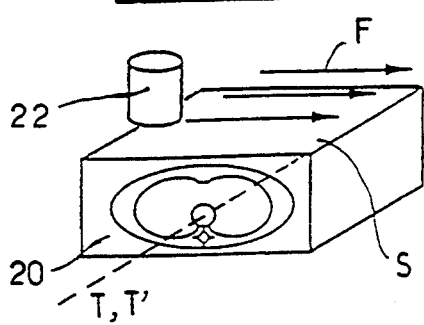
FIGS. 2a, 2b, 2c and 2d illustrate diagrammatically the principle of detection as a function of the position of the detector with respect to the object to be observed for an elementary plane capture.
Figure 2B:
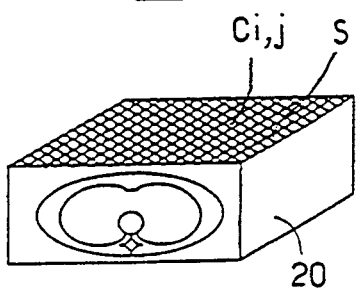
Figure 2C:
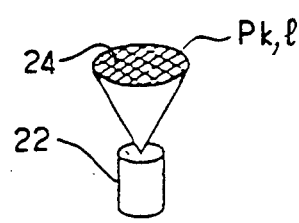
Figure 2D:
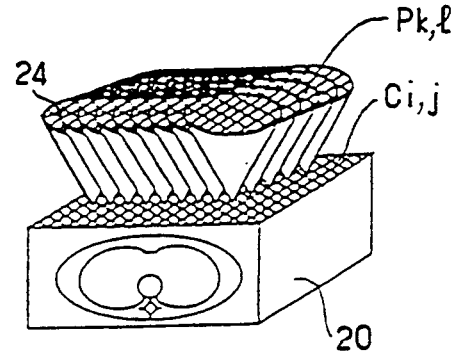

The diagrams 2a to 2d illustrate this mode of coding. In FIG. 2a has been represented diagrammatically the object to be detected 20 which emits the gamma rays and the mobile detector 22. The arrow F gives the direction of the relative displacement of the detector 22 with respect to the object 20. On the surface S symbolizing the interface between the various positions of the detector and the object 20 to be analyzed, the various positions $C_{ij}$ occupied in succession by the detector 22 have been represented. There are thus $N \times N$ positions of the detector 22 if i and j vary from 0 to N. Moreover, in FIG. 2c, it has been shown that the detector 22 and more precisely its scintillator make it possible to define elementary detection surfaces or pixels $P_{kl}$. The detector 22 thus defines $n \times n$ pixels if k and 1 vary from 0 to n. In FIG. 2d have been combined symbolically the various positions of the detector 22, each represented by a cone 24, and for each detector position the various pixels $P_{kl}$. A data set is thus obtained forming a 4 dimension matrix of numbers from which the object to be studied is sought for the coordinates x, y, z of the various points of the emitting source.

This coding mode is again analogous to coding used by transverse axial tomography, in which a series of images are acquired from various angles constituting a three-dimensional set of numbers for reconstructing likewise a three-dimensional set of numbers (corresponding to the radioactive density in the case of emission tomography) but in the present case, a three-dimensional object is recreated from a four-dimensional capture.

The problems of image reconstruction can be solved if more data than numbers to be calculated are obtained. Several methods of computation may then be used. As regards the recreation of tomographic images, there may be distinguished for example the solving of the linear system by a direct or iterative method, optimization methods of the maximum likelihood search type and the so-called filtered back-projection method. This latter method is the one employed most since it is fast and limits the propagation and amplification of errors as much as possible.

According to the present invention, an additive method termed shift-summation has been developed which, like filtered back-projection, makes it possible to use in an additive way all the data obtained relating to a given point of the object to be analyzed, which thus ensures complete effectiveness of the output of the detector while using a larger part of the number of gamma photons emitted by the source than in the case of a conventional gamma camera.

In order to simplify the formulae and the explanations and so as to make it possible to give a graphical representation of the phenomena involved, the description which follows is limited to a reduced capture obtained with a detector assumed to be linear moving in a direction in order to study a plane of the object. This reduction in the working space affords no simplification to the principle of processing and the method which will be set forth is readily transferrable to the general case cited earlier, that is to say in the case of a three-dimensional object.

Figure 1:
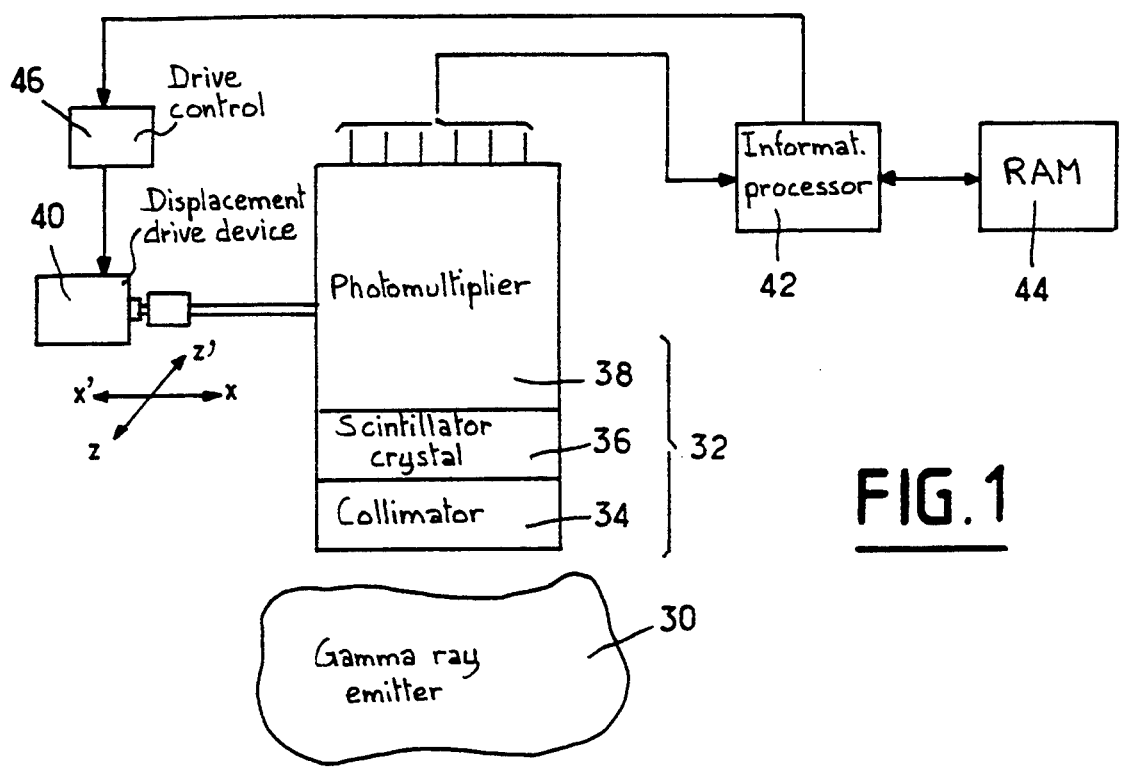
FIG. 1 is a simplified diagram of the whole of the gamma camera system.

FIG. 1 shows in a simplified form the whole of the gamma camera system.

The object to be examined has been represented by 30 and may, for example, be an organ of a patient into which a tracer emitting gamma rays has been injected. Facing the object 30 is the gamma camera 32 consisting, as is well known, of in succession a collimator 34, and a detector consisting, in the example represented in FIG. 1, of a scintillator device 36 and a photomultiplier assembly 38. The whole of the gamma camera 32 can be displaced with respect to the object 30, for example with the aid of a drive device diagrammatically represented by the reference 40. The drive device 40 enables the gamma camera to be displaced in a "horizontal" plane labelled by the axes xx' and zz' so as to scan the whole of the object 30 as will be explained later. It is sufficient to note that the drive device 40 is capable of displacing the gamma camera 32 in predetermined successive steps of the order of magnitude of the resolution sought.

At the exit of the photomultiplier assembly 38, is obtained a succession of electrical signals representing the point of impact of the photons on the entrance face of the scintillator. These signals are therefore representative, to a first approximation, of the coordinates x and z of the points of impact of the gamma rays for each position of the gamma camera. The position signals are applied to an information processing assembly 42 which may advantageously be computer hardware. A part of the random-access memory of the computer means 42 has been represented diagrammatically by 44. Furthermore, the circuit for control of the drive means 40 has been referenced 46, this control circuit 46 receiving instructions from the computer means 42.

As has already been indicated and so as to simplify the explanation of the invention, the mode of processing the signal and the capture of the information with the aid of a gamma camera which is assumed to be linear and which makes it possible to obtain the image of two point emitting sources A and B will be described while referring more particularly to FIGS. 3 to 7.

In FIG. 3 has been represented diagrammatically the object 30 to be inspected, the collimator 34 and the scintillator crystal 36 of the gamma camera. In this simplified embodiment, the collimator 34 includes a single frustoconical opening 50. For the purposes of explaining the invention, the position of the gamma camera 32 is labelled with respect to a system of "horizontal" OX and "vertical" OY axes, that is to say more precisely perpendicular to the line of displacement of the gamma camera. A point of the scintillator crystal 36 is labelled with the coordinates of the point N expressed as a function of $\chi$ which is the value of x corresponding to the midpoint O' of the crystal and $\nu$ which represents the abscissa of the relevant point N with respect to the origin O'. Moreover, at its entrance, the opening 50 has a diameter 1 and at its exit, that is to say level with the entrance face 36a of the scintillator 36, the opening has a diameter equal to L. As has already been indicated, 1 is greater than the intrinsic resolution of the scintillator 36 and, preferably, greater than twice this resolution. Furthermore, the distance between the entrance face of the collimator 34 and the entrance face 36a of the scintillator crystal is equal to p. It is thus understood that the point M of the object 30 to be observed is represented by the coordinates x, y, whilst a point N of the entrance face of the scintillator crystal is labelled by the coordinates $\chi$, $\nu$.

So as to make the invention more understandable, while referring to FIG. 5, there will be described the capture, with the aid of the gamma camera 32' assumed linear, of the gamma radiation emitted by two point sources A and B in the slice of the object of thickness dz, the point B lying in the plane of the entrance face of the collimator, that is to say at the distance p from the entrance face of the detector and having the value 90 as abscissa x, whilst the point A has abscissa 50 and ordinate p+64.

FIGS. 4a and 4b make more understandable the determination of the limits of integration in x for determining all the gamma rays received by the detector during displacement of the gamma camera along the direction $\chi$. These limits correspond to the following expressions:

$$b_1 = \chi + \nu - y/p(\nu - \tfrac{1}{2}), \text{ and}$$

$$b_2 = \chi + \nu - y/p(\nu - \tfrac{L}{2}).$$

Furthermore, the limits of integration in y are p and $\tau$ if $\tau$ is the value of y corresponding to the point of the object 30 furthest from the entrance face of the gamma camera.

Calling $\rho(x,y)$ the radioactive source density the response of the detection system, which will be called $g(\chi,\nu)$, is given by:

$$g(\chi,\nu) = \int_p^\tau \int_{b_1}^{b_2} (\cos\theta/d^2)\rho(x,y)dxdy \qquad (1)$$

In this expression, the factor $\cos\theta/d^2$ represents the separation term in Lambert's law, $\theta$ being the angle of inclination of the ray with respect to the surface 36a of the detection crystal. To simplify the discussion, in the subsequent formulae the term in $\cos\theta/d^2$ which, in the case of a collimator whose opening is deeper than it is wide, exhibits small variations only and may be regarded as constant. Moreover, this approximation affords no significant change to the principle of processing.

The processing carried out by the computer system 40 therefore consists, starting from the set of values of g for the various successive positions of the collimator and which are captured in the memory 42, in determining the value of $\rho$ for the various values x, y.

It therefore suffices to invert the integral equation to obtain the expression $\rho(x, y)$ from the response of the detector $g(\chi, \nu)$.

A preferred method of solving this equation will be described below.

Figure 6:
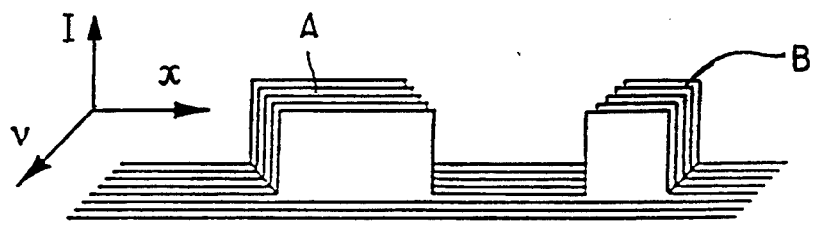
FIG. 6 shows in perspective, in a conventional form, the nature of the signals gathered before processing corresponding to the two point sources shown in FIG. 5.

So as to make this method more understandable, FIG. 6 represents in perspective the response of the detector respectively to the gamma ray emitted by the point source B and by the point source A in the space labelled with the coordinates $\chi$ and $\nu$ and with the axis I on which are plotted the numbers of impacts received by the detector. As is seen in FIG. 6, the response of the detector to the source B is a top-hat function in $\chi$ which is independent of $\nu$. Indeed, the source B is placed in the entrance plane of the collimator. On the other hand, for the point A situated at the distance 64 from the entrance plane of the collimator, the left-hand region of the detector senses the source B before that situated on the right. There is therefore a response whose base in the $\chi$ and $\nu$ plane is parallelepipedal in shape. The intensities I are constant owing to having neglected the variations in the term $\cos\theta/d^2$. Otherwise, the intensity corresponding to the source B would be higher than for the source A since the latter is further from the entrance plane of the collimator.

According to the invention, the processing of the information gathered in the memory by the detector consists in carrying out a shift summation. More precisely, the responses $g(\chi,\nu)$ acquired for various positions of the detector, that is to say for various values of $\chi$, are shifted as a function of a new parameter $\zeta$. To do this, we make the change of variable $$\nu_2 = \nu_1$$

$$\chi = \chi_1 + \nu_1(\zeta/p - 1) \tag{1}$$

Then, for each of the values of $\chi$ and $\zeta$, a summation is performed over the various values of $\nu$, that is to say $\nu$ varying from $-L/2$ to $+L/2$ since the length of the detector crystal in the x direction is equal to L.

Figure 7:
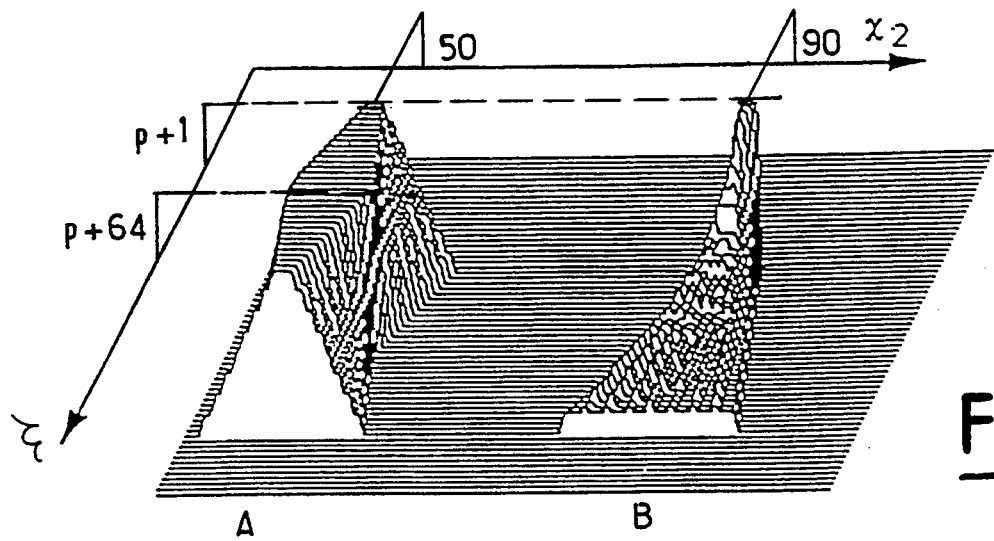
FIG. 7 shows a perspective view showing the signals obtained after a first phase of processing of the signals delivered by the gamma camera.

We thus obtain a function of $\chi$ and of $\zeta$. FIG. 7 shows the image of this function of $\chi$ and of $\zeta$ in the relevant example, that is to say for the two point emitting sources A and B and the detector being linear. It is seen that for the two images corresponding to the two sources, a top-hat function in $\chi$ is recovered for the values of $\zeta$ corresponding to the values of y associated with the positions of the point sources. For the other values of $\zeta$, the response of the system broadens and lessens in intensity. Hence, a spread in $\zeta$ of the responses which are not concordant with the position of the emitting sources is in effect obtained, the concordant responses being more intense and having steeper slopes corresponding to a top-hat function. In the subsequent explanations, the coordinate $\chi$ will be replaced by x and $\zeta$ will be replaced by y in order to recover the reconstructed density $\rho(x,y)$.

In the next step of the processing, the preceding image is deconvolved with a top-hat of semi-length $1y/2p$ in order to recover the initial Dirac functions, that is to say the densities of gamma rays emitted by the two sources A and B.

It is therefore seen that it is possible, starting from the recording of the pulse signals emitted by the detector for all the coordinate pairs $\chi$, $\nu$ of the detector, actually to recreate the emission density function $\rho(x,y)$ for all the source points of the object 30 in the relevant slice ("vertical" plane). This means that, in this slice of thickness dz, the values of $\rho$ are obtained for each point of the object (x,y), that is to say the same results as in the case of tomography and not merely a plane projection of the image of the object in a plane perpendicular to the axis of the detector.

In fact the method described hitherto is only approximate. Indeed, the responses produced in those layers of the image situated above or below the actual depth of the source, although spread out, are not zero. This effect can be removed by applying the iterative method described below. In order to understand this method, the coordinate y is discretized, thus varying from 1 to n in integer values. The source density becomes: $\rho_i(x)$ wherein i represents the ordinate. Let $R_{ij}$ be the response of a source point actually situated at the ordinate yi, and recreated at the ordinate $\zeta j$ after shift summation. Thus, the response of the system at the ordinate j can be written:

$$S_j(x) = \rho_i \widehat{x} R_{ij}(x) \tag{2}$$

with summation over the repeated indices (i), and or $\widehat{x}$ represents the convolution product, this equation states what was seen earlier, namely that the response of the system varies with the depth in the object. In the reconstruction, a source point extends over all depths of the reconstructed image. At an arbitrary depth the response is a top-hat function, this being expressed symbolically by a double index: $R_{ii}$, and in the other cases the response has the shape of a trapezium (response with two different indices). If a Fourier transform is performed on equation (2), the convolution products are replaced by straightforward multiplications, and a linear system is recognised, which may be written in matrix form:

$$s = t.r$$

The vector s (the Fourier transform of S) and the matrix (of functions) r (the Fourier transform of R) being known, the vector t (the Fourier transform of $\rho$) is sought.

Since the system is of large size, direct solution may prove to be a fairly lengthy business. Observing that the diagonal terms are the largest, the use of an iterative method may be envisaged. To do this, each row is divided by the corresponding diagonal terms:

$$s_j/r_{jj} = t_j + \Sigma_{i \neq j} t_i r_{ij}/r_{jj} \tag{3}$$

or $$t_j = s_j/r_{jj} - \Sigma_{i \neq j} t_i r_{ij}/r_{jj} \tag{4}$$

This equation is easily transformed into an iterative system (the method of successive approximations) and converges if the diagonal elements are the largest elements, this being the case here. So the first step consists, in direct space, of a straightforward deconvolution which we have already carried out:

$$t_j^{(0)} = s_j/r_{jj} \tag{5}$$

and the following steps can be written:

$$t_j^{(n+1)} = s_j/r_{jj} - \Sigma_{i \neq j} t_i^{(n)} r_{ij}/r_{jj} \tag{6}$$

Although mathematically exact, in some cases, it may in practice be fairly difficult to recreate the function sought $\rho(x,y)$ from the data obtained by the plane scanning of a single hole as was described in connection with FIG. 5. Indeed, if this hole is deep and narrow, the information in depth, that is to say in the direction y perpendicular to the plane of the detector, is very small. Conversely, if the hole is wide and shallow, the various responses associated with the successive positions of the gamma camera are in danger of merging in the direction of displacement x.

In order to increase the reliability of the processing for recreating the function ρ(x, y), several methods may be used, which methods may be combined together.

The first method consists in making several captures with holes of different shapes. Holes with axes inclined with respect to the plane of the collimator may be used for this purpose.

Figure 5:
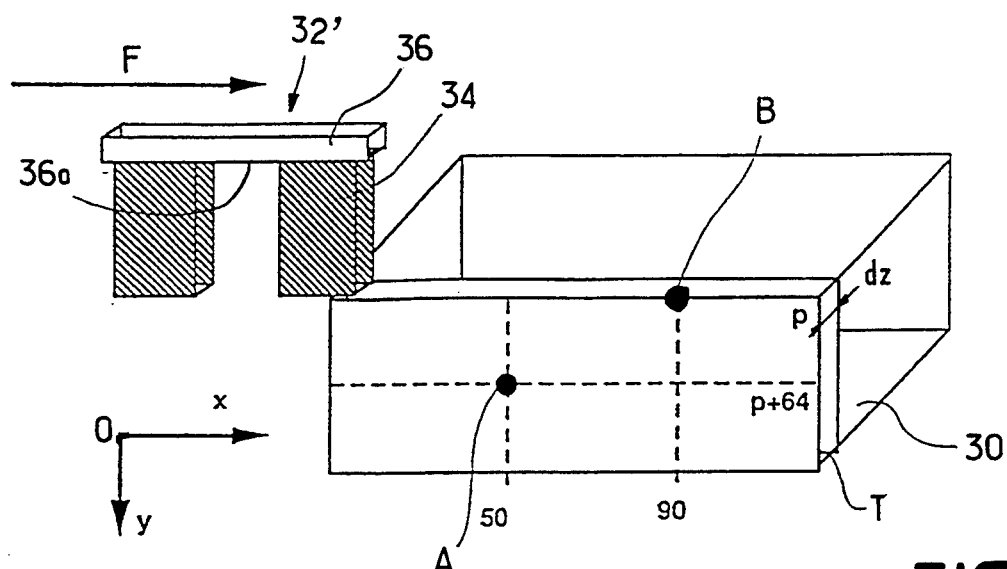
FIG. 5 is a simplified prospective view illustrating the capture of the information corresponding to two point sources of gamma radiation in a vertical plane.
Figure 14:
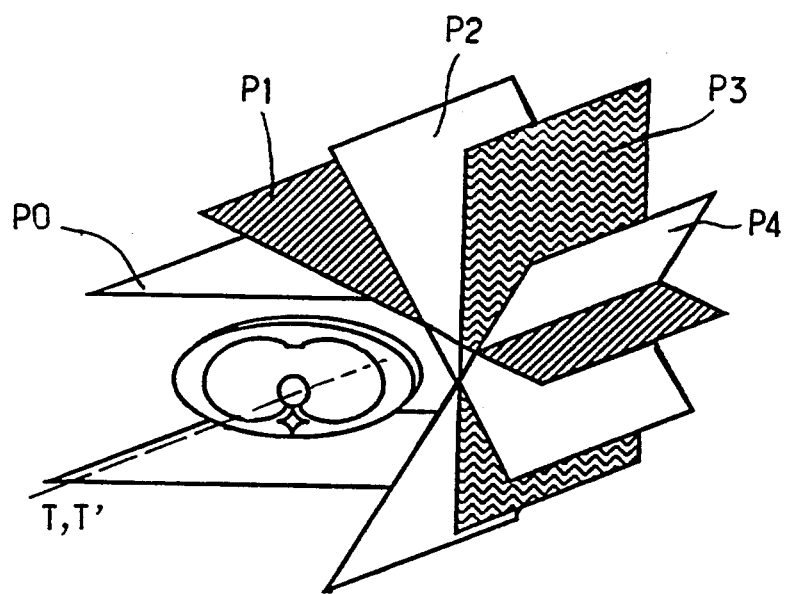
FIG. 14 illustrates a tomographic method for improving the reconstruction of the function $\rho(x,y,z)$.

Another solution consists in using a method akin to transverse axial tomography according to which the plane scan described in connection with FIG. 5 is repeated in several planes which are parallel to the axis TT' of the object to be observed, that is to say, in the particular case described, of the patient. This is illustrated by FIG. 14. Po references the scanning plane in FIG. 5 and Pα (P1, P2, P3, P4 . . . ) references the other scanning planes which may be labelled via the dihedron which they form with the reference plane Po. By way of example, the dihedron between two successive scanning planes may be of the order of 30 degrees, this corresponding to 12 scanning planes in order to go right round the object to be observed.

Calling α the index of a hole of the collimator and/or of the angle of inclination of the plane (Pα) corresponding to a given plane scan, for each value of α the following linear system, in Fourier space, is obtained:

$$s_\alpha = t.r$$

In this expression s and r depend on the parameter α, that is to say on the scanning plane or on the relevant hole, but the function t sought is independent of α.

A new linear system is thus obtained by summing over α these elementary linear systems. For example, if the collimator includes two holes and if scans are performed in twelve different planes, α can take 24 different values. Let an be this number, equation (4) can then be written:

$$an t_j = \Sigma_\alpha s_j / r_{jj}\alpha - \Sigma_{i \neq j} \Sigma_\alpha t_{i r_{ij}\alpha} / r_{jj}$$

This linear system will be solved by the method of successive approximations as was described earlier, but with a better result. Indeed, the non-diagonal terms give rather responses perpendicular to the plane of detection which do not add contrary to the diagonal terms. According to this embodiment, it is obvious that the displacement device 40 of the gamma camera must moreover allow a displacement having a component along the yy' axis perpendicular to the xOz plane.

In the previous detailed description of the mode of processing according to the present invention, consideration was given to an x,y "slice" of the object and to a linear detector. However, the expert will understand that the same processing can be applied when extended to the whole of the object (z coordinate in addition) and to a two-dimensional detector in order to obtain reconstruction of the emission density ρ in space (x,y,z) from coordinates χ and λ tied to the centre of the scintillator crystal ν and γ labelling each "pixel" of the crystal.

After having described the mode of processing the signals delivered by the gamma camera, several embodiments of the gamma camera according to the invention will be described.

Figure 8:
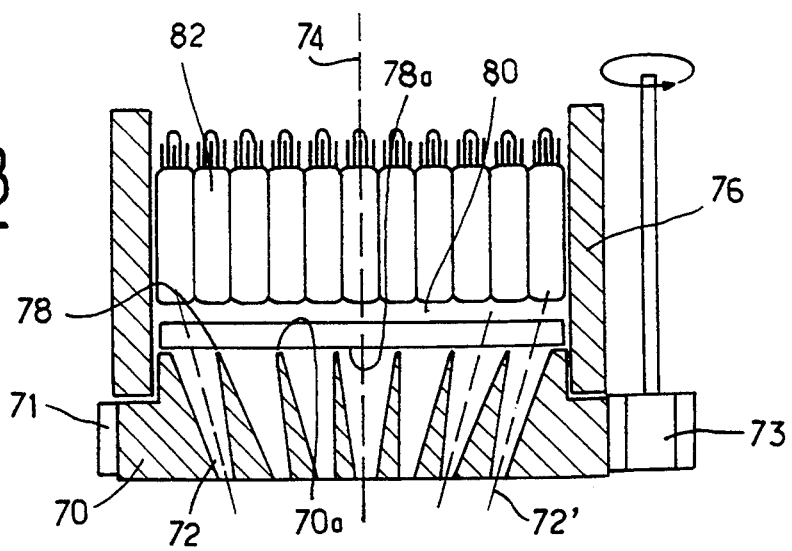
FIG. 8 is a vertical sectional view of a first practical embodiment of the gamma camera.
Figure 9A:
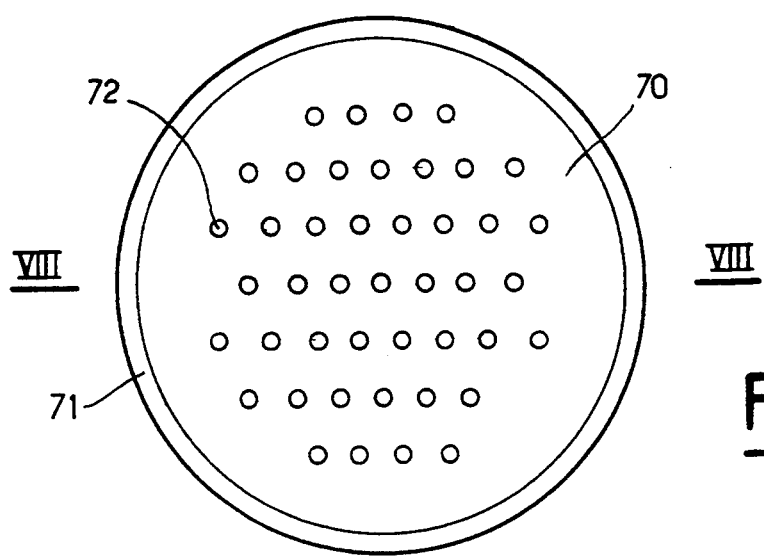
FIG. 9a is a plan view of the collimator of FIG. 8.

FIGS. 8 and 9a show a first embodiment in which the gamma camera includes a plane detection crystal. In this embodiment, the collimator 70 has the shape of a disc drilled with regularly distributed openings 72, these openings having a large diameter in the sense defined earlier. Each opening 72 has a frustoconical shape. The whole of the collimator 70 is mounted pivotably about an axis 74. The collimator 70 is driven in rotation about its axis 74 by way of a toothed crown 71 cooperating with a pinion 73 itself driven by a motive member, not represented in the figure. The shield 76 of the gamma camera, as well as the scintillator crystal 78 placed behind the collimator 70, a light guide 80 and a set of photomultipliers 82 have also been represented in FIG. 8. It is thus understood that, with respect to the detection part of the gamma camera formed by the scintillator crystal and photomultipliers, the collimator 70 rotates about the axis 74. Furthermore, the gamma camera as a whole is subjected to a motion of translational displacement possibly in various planes if an inclination of the scanning plane is required. Returning to the initial explanation corresponding to a unit detector with a single opening, it is seen that the coordinate χ corresponds in fact to the combination of two displacements consisting, on the one hand, of the global translational motion of the gamma camera and of the rotational motion of the collimator about its axis 74 in order to achieve the various positions Cij. The step resulting from the displacement is of the order of magnitude of the resolution desired.

Figure 9B:
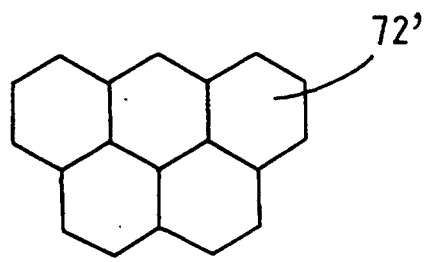
FIG. 9b is a plan view showing an embodiment in which the openings have a hexagonal cross-section.

In the embodiment represented in FIGS. 8 and 9a, the axes 72' of the openings 72 are inclined with respect to the axis of rotation 74 of the collimator 70. According to other embodiments of the collimator, the openings could be frustoconical or cylindrical, or even a combination of these two shapes, with axes parallel to the axis of rotation 74. According to yet another embodiment, the openings shown in FIG. 8 may have a hexagonal cross section, as shown in FIG. 9b.

According to another characteristic of the invention, a space can separate the exit face of the collimator 70a from the entrance face 78a of the crystal. This layout is very different from the Anger camera. Indeed, in the latter such a placement would cause blurring of the image. Here, the reconstruction algorithm accommodates fairly well to this, and hence a spacing can be made in order to magnify the radiant image gathered by the crystal. This makes it possible to match the size of the pixel (and the object resolution) with the intrinsic resolution of the detector. It is in fact of prime importance to have enough elementary data to allow the reconstruction of the whole volume situated under the apparatus, whence an adequate ratio of number of pixels captured to number of voxels (elementary volumes). The remainder of the device is similar to a conventional Anger camera. With this difference, that care must of course be taken over the counting swing, the rise in sensitivity having to lead to an increased counting rate. A preliminary computation would give, for a collimator 95 mm in thickness, with 271 holes of 14 mm radius separated by 1 mm and an intrinsic resolution of 3 mm (the resolution at detector level), a resolution from 10 mm to 100 mm in depth through the object and a sensitivity greater than $7 \cdot 10^{-3}$ for a cubic source with 200 mm edges. By comparison, a conventional collimator with parallel holes having the same resolution at object level requires 32000 hexagonal holes with 1.3 mm semi-width, 53 mm in depth and partitions 0.2 mm thick. Apart from the considerable difficulties in manufacturing such a collimator, it is noted that these septa are very slender, which limits the quality of collimation (such a collimator is moreover totally ineffective for gamma rays of energy greater than 200 Kev. Finally, its sensitivity is $3.10^{-4}$, namely 20 times lower than the gamma camera system according to the invention. The characteristics of such a configuration are in fact limited by the inclination of the extreme rays. More generally, the openings of large width have a dimension greater than the intrinsic resolution of the detector and, preferably, greater than twice this resolution in proximity to the entrance face of the detector. Typically, the entrance face of an opening of the collimator has a diameter or a large dimensions, preferably at least equal to 5 millimeters.

Figure 10:
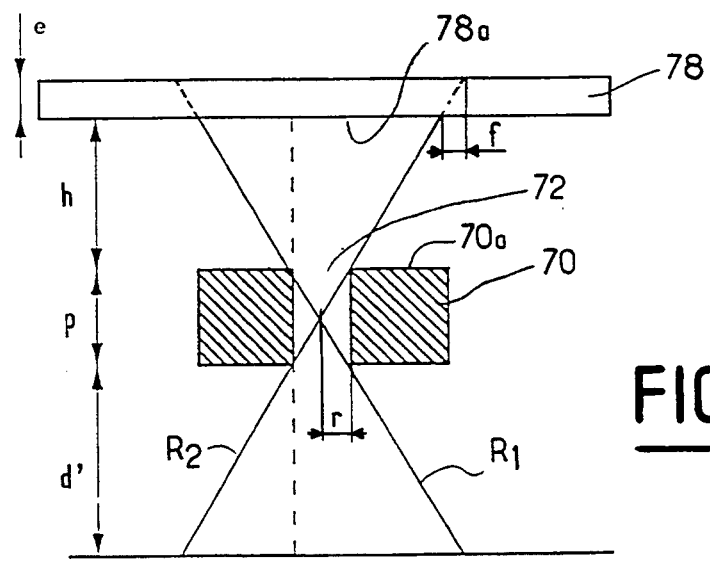
FIG. 10 is a simplified diagram illustrating the limits of the resolution which is engendered by the thickness of the scintillator crystal.

In the above description there is a limitation through an aspect of the problem related to the use of a collimator with holes of large diameters, namely that because of the inclination of the extreme rays the effect of the thickness e of the scintillator crystal on the resolution of the system can no longer be neglected. FIG. 10 illustrates this problem. A collimator 70 having a single cylindrical hole 72 of radius r has been represented in this figure, the thickness of the collimator still being equal to p. The scintillator crystal 78 has also been represented, the entrance face 78a of which is situated at the distance h from the collimator 70 and which has a thickness e. The two extreme rays defined by the edges of the hole 72 have been represented by $R_1$ and $R_2$. It is understood that these rays are those most inclined with respect to the plane entrance face of the crystal. As shown by the dotted extensions of the rays $R_1$ and $R_2$, the emission of the photon can occur over a stretch of distance f. More generally, the intrinsic resolution Ri of the plane detector is given by the formula:

$$Ri/e = 2rt/p.$$

Furthermore, the distance h is limited by the number of significant pixels and by the object resolution Ro at the relevant distance d' through the expression:

$$h = Ri/Ro\ (p/2 + d') - p/2.$$

It must however be noted that the uncertainty in the distance becomes significant only for gamma radiation of high energy, typically greater than 100 keV. Indeed, for low energies the interaction occurs in the immediate proximity of the entrance face 78a.

To remedy this disadvantage, a solution illustrated by FIG. 11 consists in using a gamma camera with a detector shaped as a portion of a spherical cap. The collimator 81 with a single hole 83 is attached to an exterior shield 84. The hole 83 is frustoconical in shape. The scintillator 86 has an entrance face 86a in the shape of a spherical cap whose axis coincides with that of the opening 83. The scintillator is for example formed of scintillating optical fibres marketed by the CEA. The gamma camera comprises photomultipliers 88 also lying on a spherical cap and coupled to the scintillator 86 by a light guide 90.

In the case in which the collimator 81 includes plural holes 83, the entrance face 86a of the scintillator 86 defines as many spherical caps as there are holes, each spherical cap having an axis of symmetry coinciding with that of the corresponding hole.

Another solution which makes it possible to retain a plane scintillator, whilst eliminating the influence of the oblique rays on the intrinsic resolution of the detector, consists in determining the depth within the crystal at which the interaction took place between the relevant gamma ray and the scintillator crystal. U.S. Pat. No. 4,675,526 granted on 23rd Jun. 1983 in the name of J. G. Rogers et al for a "process and apparatus for 3-dimensional coding" describes, in the context of positron emission tomography (PET), such a computational process.

This computational process makes it possible, for a given thickness of the detector crystal, to reduce the effects of the extreme inclined rays by a factor proportional to the accuracy of the measurement. For example, for a crystal of thickness e = 10 mm, the determination of the depth of the interaction to an accuracy of 5 mm (half the thickness) makes it possible to use rays having double the inclination without changing the resolution of the detector.

Owing to the use of holes of large width, the rays leaning on the edge 102a of the face of the opening 102 emerging in the face 100a of the collimator will have a sizeable inclination and will be sources reducing the accuracy of location at detector level. FIG. 12 shows a variant embodiment enabling the sensitivity resolution ratio of the apparatus to be optimized. According to this embodiment, the collimator 100 has a frustoconical opening 102 which widens out towards the curved scintillator crystal 104. Thus, the angle $\beta$ defining the intrinsic resolution of the detector, which is limited by the edge of the opening 102 emerging in the face 100a, has a reduced value whilst the angle $\gamma$ defining the sensitivity, which is limited by the edge of the opening 102 emerging in the face 100b of the collimator, may be maximized. For example, for a collimator with a single hole 135 mm thick, with a radius $r_1$ of 50 mm at the entrance and a radius $r_2$ of 120 mm on the detector side, and on disposing a scintillator crystal of spherical shape (with intrinsic resolution of 3 mm) at a distance of 33 mm behind this collimator; it is possible to obtain a resolution of from 5 mm to 100 mm in depth into the object, with an output of $1.5\ 10^{-3}$. Namely an output 10 times greater than a conventional gamma camera with twice as good a resolution.

Such an arrangement can however be envisaged only for gamma rays of small energies (even if it is possible to use an element with large Z to augment the absorption at the level of the apex of the collimator, such as tungsten). Indeed, the acute edges of the collimator then exhibiting an acute angle would very likely be crossed by highly energetic radiation.

For the radiations of very high energy, FIG. 13 shows a preferred embodiment of the collimator. The optimal geometry of the opening 112 of the collimator 110 is circular in cross section, the assembly having the shape of a portion of a torus 116. With such a configuration the thickness of the absorbent medium increases very quickly on moving away from the hole, and this increase is independent of the angle of incidence of the ray.

In the above description the case was envisaged in which the detector of the gamma camera consists of the combination of a scintillator crystal and photomultipliers. It is self-evident that it would not depart from the invention if the photomultipliers were replaced by other photon/electrical pulse converters, such as charge-transfer devices.

Similarly, it would not depart from the invention if the detector were to consist of a component allowing direct gamma ray/electrical pulse conversion, for example certain types of semiconductors (photodiodes or charge-transfer device) or spark chambers. In this case, the intrinsic resolution of the detector is very substantially improved.

In the above description, the case was envisaged in which, in addition to the displacing of the gamma camera, the collimator is given a rotational motion with respect to the body of the camera so as to obtain adequate scanning. Such a solution may, in some cases, have disadvantages by virtue of the weight of the collimator. FIGS. 15 to 18b illustrate another embodiment of the camera and, more particularly, of the placement of the openings in the collimator which allow only a linear displacement of the camera, the collimator being fixed with respect to the body of the camera, whilst ensuring the equivalent of a suitable two-dimensional scanning.

Figure 15:
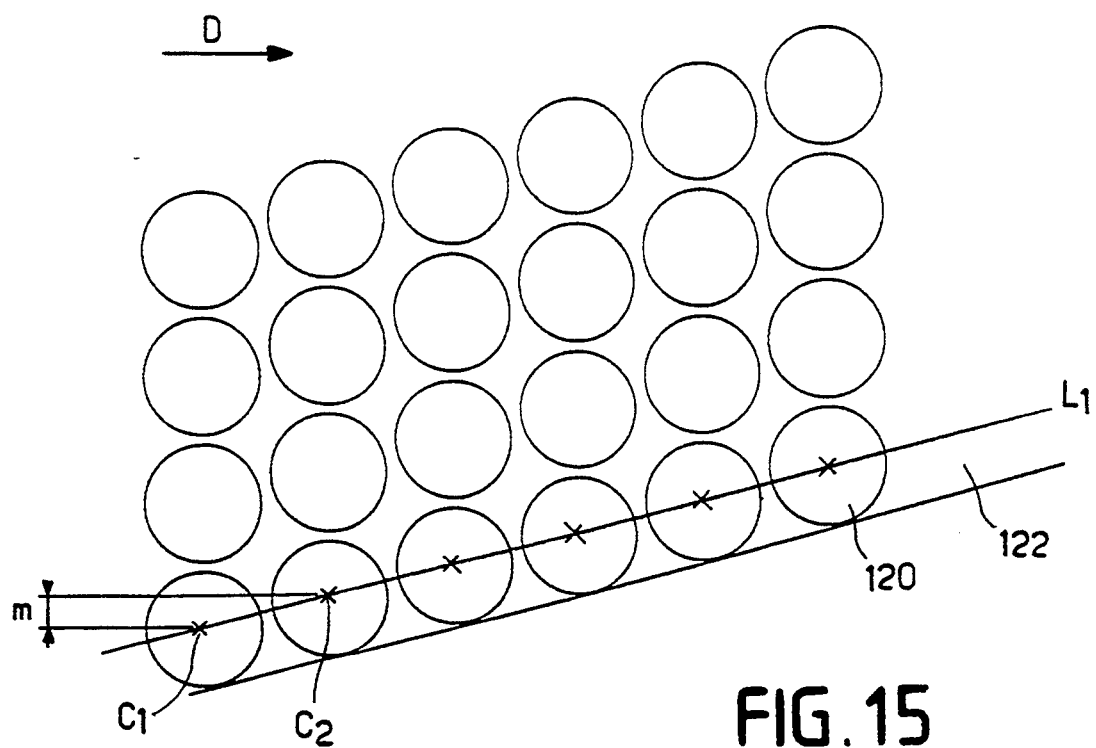
FIGS. 15 to 17 illustrate another embodiment of the collimator in the case where the latter is fixed with respect to the gamma camera.

According to this embodiment, the collimator is fixed with respect to the body of the camera and it is the whole camera only which is displaced. However, in order to ensure adequate scanning of the object to be observed, the holes are placed in a particular manner as shown in FIG. 15. The holes 120 made in the collimator 122 are placed preferably in a compact hexagonal arrangement. Furthermore, the centres of the holes 120 aligned on the same straight line D1 make an angle a with the direction D of displacement of the camera. The angle a is such that the distance between the centres C1, C2 of two consecutive holes, in the direction perpendicular to the direction of displacement D, is equal to the displacement step m of the gamma camera which is of the order of magnitude of the desired resolution. In order to simplify the figure, the holes 120 are not represented in a compact hexagonal configuration.

Figure 16:
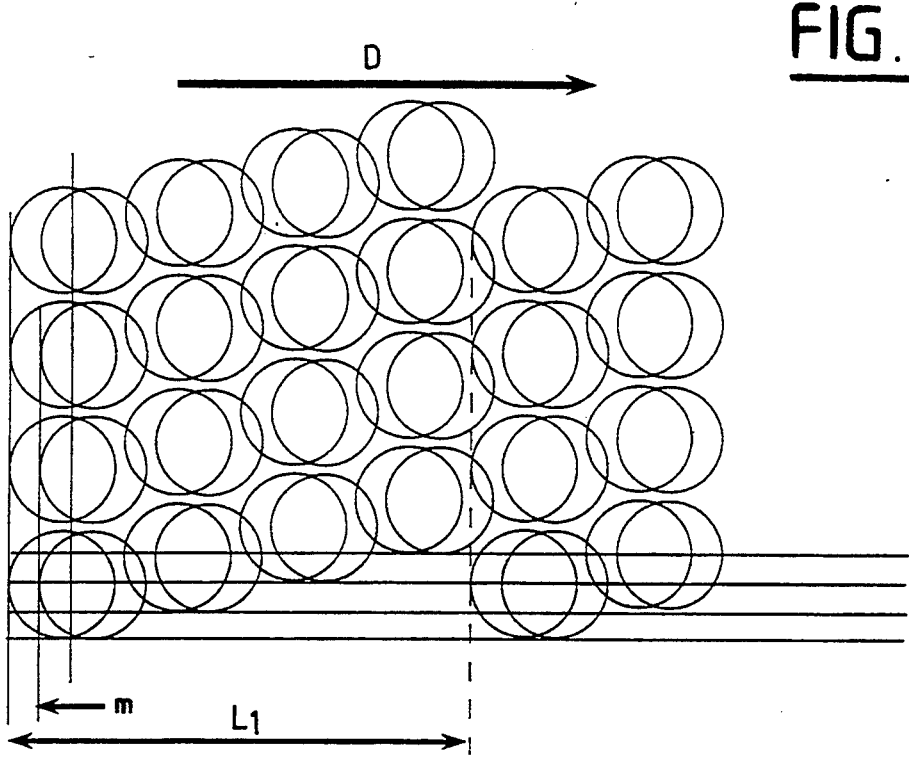
Figure 17:
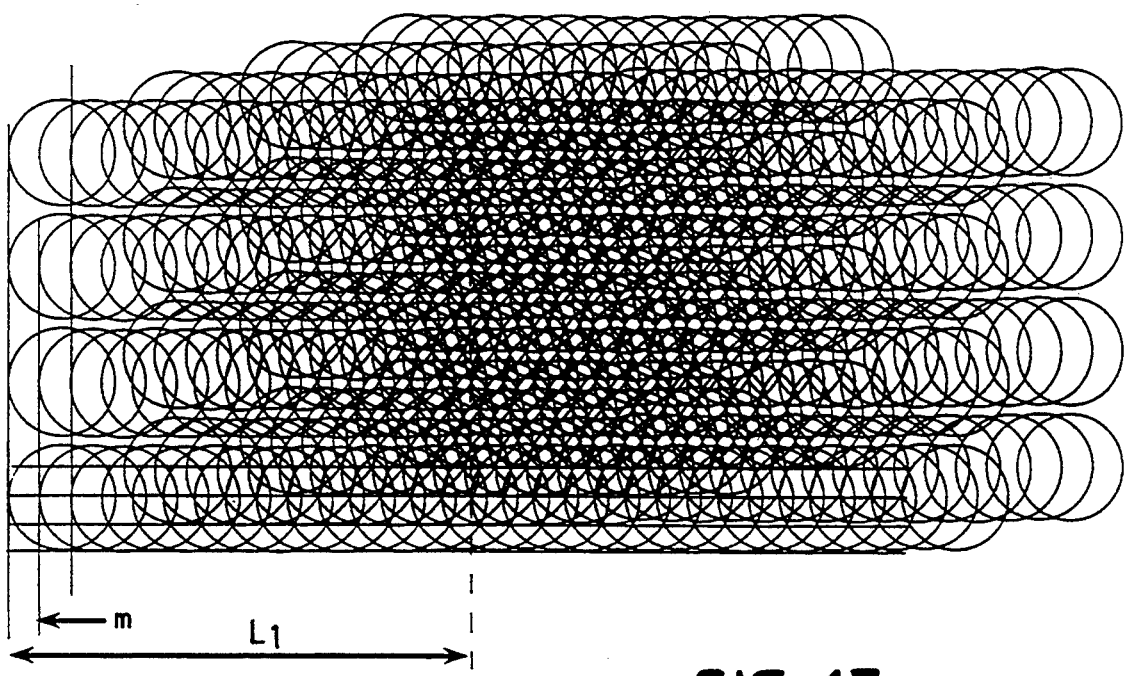

FIG. 16 shows the initial position of the holes 120 and their position after displacing the camera by the step m. It is understood that, once the gamma camera has been displaced by a length L1 equal to the period of the system created by the holes 120 of the collimator 122, the apparatus is displaced globally by a length L1, then the scanning by steps m is resumed over the next period. FIG. 17 shows the successive positions occupied by the holes 120 during scanning in the direction D.

Figure 18B:
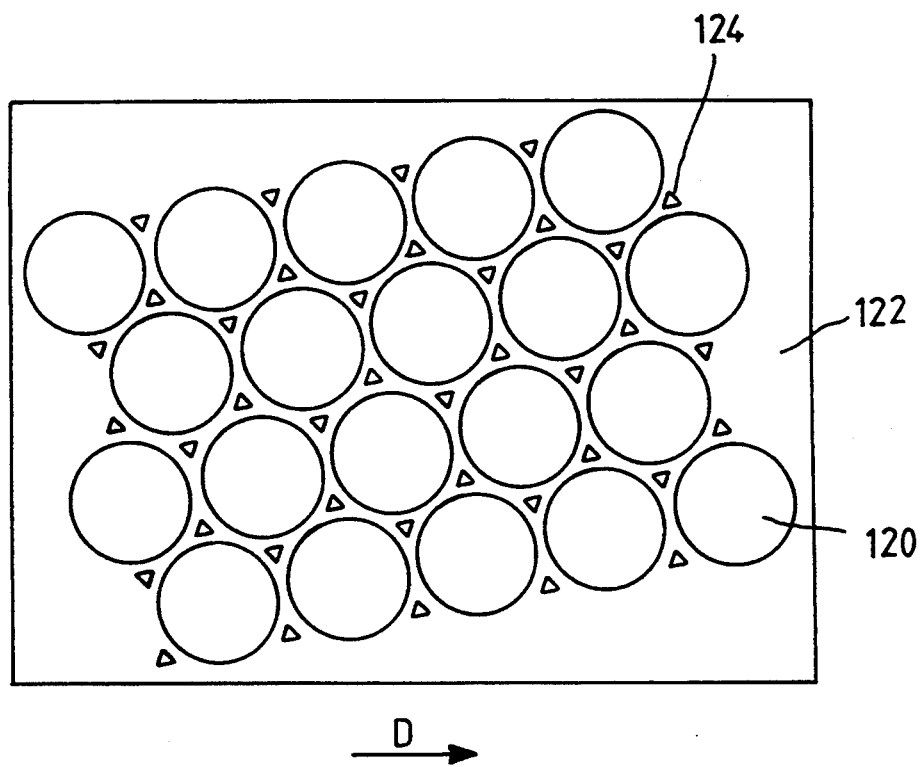
Figure 18A:
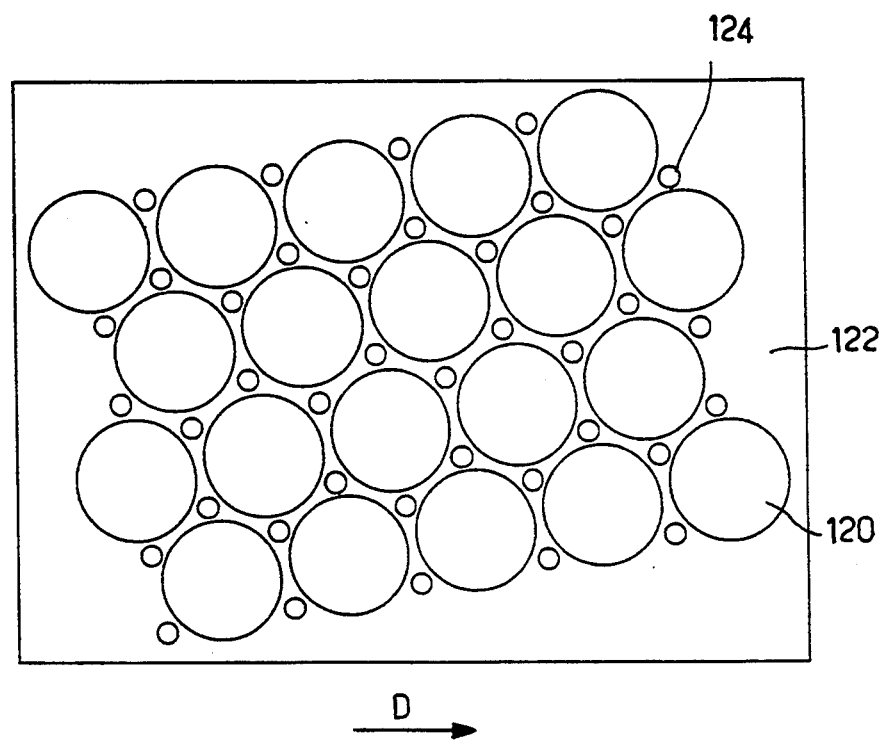
FIG. 18a illustrates a variant of the embodiment of FIGS. 15 to 17.

FIG. 18a shows a compact hexagonal arrangement of the holes 120 of the collimator 122. As in the case of FIGS. 15 to 17, the holes in the same line are shifted by a step m. In this configuration, it is moreover possible to provide for a second set of holes 124 of lesser diameter. The information gathered by the two sets of holes 120 and 124 must be processed as described on page 14, certain values of the parameter $\alpha$ corresponding to a first series of holes 120 and that the other values of the parameter corresponding to the second series of holes 124. It is self-evident that it would be possible to have more than two sets of holes. Similarly, instead of having a circular cross section, as represented in FIGS. 15 to 18a, they could have a polygonal cross section, for example hexagonal. It is furthermore possible to combine holes with circular cross section and holes with polygonal cross section as shown in FIG. 18b. Optimum utilization of the detector disposed behind the collimator 122 is thereby achieved. As a first approximation, the holes 120 of large dimension improve the sensitivity of the measurement and the holes 124 of lesser dimension improve the resolution. The detector is preferably rectangular.

As a variant, the openings may have a hexagonal cross section, the centres of symmetry of the openings being aligned on straight lines making the angle already mentioned with the direction of displacement D.

In addition to the advantages already mentioned, it is important to stress that, even whilst retaining the same contact resolution of the scintillator, the resolution in depth into the object observed is very substantially improved.

I claim:

1. High sensitivity gamma camera system for formulating an image of a gamma radiation emitter having a predetermined resolution, comprising:

a gamma camera comprising a collimator, a detector having an entrance face placed behind the collimator in order to convert the gamma rays which have passed through the collimator, and which impinge on each point of said detector, into electrical pulses in order to give an indication for locating the point of impact of the gamma ray emitted, said detector exhibiting an intrinsic resolution, and an assembly for processing the electrical signals in order to formulate an image of the gamma radiation emitter; and means for displacing said gamma camera by successive steps, wherein said collimator comprises at least one opening whose largest cross-section in proximity to the said detector has a dimension greater than twice the intrinsic resolution of the detector, by which there pass through each opening plural beams giving plural points of impact on said detector, wherein said displacing steps are of the order of magnitude of the predetermined resolution, and wherein said processing assembly comprises means for storing the electrical signals gathered corresponding to said points of impact with their locating information (v, y) of the point of impact on said detector for each position $(\chi,\lambda)$ of said at least one opening of said gamma camera, and means for processing the information thus stored (v, y, $\chi$, $\lambda$) in order to reconstruct an emitted radiation volume density function $\rho$(x, y, z) for x, y, z corresponding to the chosen displacing step.

2. Gamma camera system according to claim 1 wherein said opening is circular or has a hexagonal cross section.

3. Gamma camera system according to claim 1, wherein said opening is frustoconical and widens towards said detector.

4. Gamma camera system according to claim 3, characterized in that said frustoconical opening is attached to the front face of the collimator by a toroidal surface portion.

5. Gamma camera system according to claim 1, wherein said collimator includes a plurality of openings.

6. Gamma camera system according to claim 5, wherein said collimator is fixed with respect to the remainder of said gamma camera and said openings lie on mutually parallel straight lines, these straight lines making an angle with the direction of displacement of the gamma camera such that the shift of the centers of two successive openings centered on the same straight line in the direction perpendicular to the direction of displacement is substantially equal to the displacement step.

7. Gamma camera system according to claim 6, wherein said openings are placed in a compact hexagonal arrangement.

8. Gamma camera system according to claim 7, wherein said openings comprise first openings and have a circular cross section and said collimator comprises at least one second set of openings having a circular or polygonal cross section of lesser diameter placed between said first openings.

9. Gamma camera system according to claim 1, wherein said collimator includes a plurality of openings whose axes are inclined with respect to the axis of the collimator.

10. Gamma camera system according to claim 1, wherein said collimator is mounted rotatably with respect to the remainder of said gamma camera.

11. Gamma camera system according to claim 10, wherein said entrance face of the detector has the shape of at least one spherical cap.

12. Gamma camera system according to claim 11, wherein the axis of revolution of each spherical cap coincides with the axis of each opening.

13. Gamma camera system according to claim 1, wherein said detector is of the direct conversion type having an entrance face.

14. Gamma camera system according to claim 1, wherein said detector comprises a scintillating system having an entrance face placed behind said collimator.

15. Gamma camera system according to claim 14, further comprising a plurality of photomultipliers placed behind said scintillating system.

16. Gamma camera system according to claim 14, further comprising a semiconductor detector behind the scintillating system.

17. Gamma camera system according to claim 1, wherein a space is made between the rear face of said collimator and the entrance face of the detector.

18. Gamma camera system according to claim 1, wherein said processing means of the processing assembly comprise means for applying to all the stored information a shift summation function through a shift of the information in a spatial direction parallel to the plane of the collimator for the information corresponding to each position of said gamma camera, and summation of said shifted information for each position of the gamma camera.

19. Gamma camera system according to claim 18, wherein said processing means further comprise means for deconvolving the function corresponding to said information, after shift summation, with a top-hat function connected with said shift.

20. Gamma camera system according to claim 1, wherein said means of displacing are controlled in order to displace said gamma camera in succesive scan planes parallel to the longitudinal axis of the object to be observed and said processing means are able to apply to all the information gathered in each plane a tomographic processing.

21. Gamma camera system according to claim 1, wherein said processing means include means for computing the depth in the detector medium of the point of interaction of each gamma ray with the detector medium.

* * * * *